United States Patent
Knox et al.

(10) Patent No.: US 6,725,165 B1
(45) Date of Patent: Apr. 20, 2004

(54) WEIGHT MEASUREMENT SYSTEM, METHOD AND WEIGHT SENSOR

(75) Inventors: Matthew J. Knox, Romulus, MI (US); Daniel F. Kopitzke, Chapel Hill, NC (US)

(73) Assignee: Autoliv ASP, Inc., Ogden, UT (US)

( * ) Notice: Subject to any disclaimer, the term of this patent is extended or adjusted under 35 U.S.C. 154(b) by 30 days.

(21) Appl. No.: 09/636,154

(22) Filed: Aug. 10, 2000

(51) Int. Cl.[7] .............................................. B60R 21/22
(52) U.S. Cl. ........................ 702/42; 701/45; 177/144; 296/65.1
(58) Field of Search ................... 702/42; 73/62.627; 340/667, 573.1, 666; 280/735, 2; 180/268, 271; 701/45; 709/49; 296/65.18; 177/144

(56) References Cited

U.S. PATENT DOCUMENTS

| | | |
|---|---|---|
| 4,155,263 A | 5/1979 | Frantz |
| 4,172,389 A | 10/1979 | Branch |
| 4,213,348 A | 7/1980 | Reinertson |
| 4,261,195 A | 4/1981 | Lockery |
| 4,407,160 A | 10/1983 | van de Velde |
| 4,462,018 A | 7/1984 | Yang |
| 4,480,478 A | 11/1984 | Sato |
| 4,510,813 A | 4/1985 | Kanazawa |
| 4,522,067 A | 6/1985 | Burger |
| 4,541,496 A | 9/1985 | Layer |
| 4,546,651 A | 10/1985 | Merrick |
| 4,620,365 A | 11/1986 | Burger |
| 4,765,188 A | 8/1988 | Krechmery |
| 4,798,093 A | 1/1989 | Kenoun |
| 4,911,016 A | 3/1990 | Miyazaki |
| 4,926,674 A | 5/1990 | Fossum |
| 5,253,532 A | 10/1993 | Kamens |
| 5,303,593 A | 4/1994 | Kremidas |
| 5,412,986 A | 5/1995 | Beringhause |
| 5,522,266 A | 6/1996 | Nicholson |
| 5,739,757 A | 4/1998 | Gioutsos |
| 5,810,392 A * | 9/1998 | Gagnon ..................... 280/735 |
| 5,821,633 A | 10/1998 | Burke et al. |
| 6,055,473 A * | 4/2000 | Zwolinski et al. ............ 701/49 |
| 6,138,067 A * | 10/2000 | Cobb et al. ................... 701/45 |
| 6,242,701 B1 * | 6/2001 | Breed et al. ................. 177/144 |
| 6,341,252 B1 * | 1/2002 | Foo et al. ..................... 701/45 |

* cited by examiner

*Primary Examiner*—Kamini Shah
(74) *Attorney, Agent, or Firm*—James D. Erickson; Sally J. Brown

(57) ABSTRACT

A weight measurement system for automatically calibrating weight sensors installed on a motor vehicle seat. The system performs a calibrate operation whenever a valid weight measurement window is found. A valid weight measurement window is defined by the seat being empty, an associated door being open and an associated seat buckle being unlatched. The system operates in a factory install mode to establish a reference zero set value and in a diagnostic mode to establish a temporary zero set value that reflects drift of the weight sensors. The temporary zero set value is used by a weight management program to control occupant restraint devices. The weight sensor has an integral body with two lands connected by an elastomeric beam. The elastomeric beam has a pair of opposed surfaces that define a region of minimum thickness and one or more regions of maximum thickness. A resistive strain gauge element is disposed on the region of minimum thickness. The system measures changes in the resistance of the weight sensor caused by weight of the seat.

37 Claims, 14 Drawing Sheets

Logic Legend

- fs-install      Factory Installation/Service Setup
- f-seq      Factory Sequence/Service Setup
- reset c & c      Reset Cycle & Counters
- alert-y      Alert Yellow Warning
- alert-r      Alert Red Warning
- rr-p      Rear Right Cell Present
- rl-p      Rear Left Cell Present
- fl-p      Front Left Cell Present
- fr-p      Front Right Cell Present
- lcp      Load Cell Present
- bkl      Buckle
- cycl      Cycle
- pdo      Passenger Door Open
- pdc      Passenger Door Closed
- es      Empty Seat
- tf-zset      Temporary Factory Zero Set
- f-zero      Factory Zero Set
- se-fs      Set Factory Read
- set-diag      Set Diagnostic Read
- set-actwt      Set Active Weight Read
- rfl      Read Front Left Cell
- rfr      Read Front Right Cell
- rrl      Reade Rear Left Cell
- rrr      Read Rear Right Cell
- actwt      Active Weight
- r12      Read Grid 1/2
- r13      Read Grid 1/3
- 12=13      Grid 1/2 = 1/3
- r42      Read Grid 4/2
- r43      Read Grid 4/3
- 42/43      Grid 4/2 = 4/3
- 1213=4243      Grid 1/2 + 1/3 = 4/2 + 4/3
- r14      Read Grid 1/4
- set d-zero      Set Diagnostics Zero Set
- pd/f      Proposed Diagnostic - vs- Factory Settings
- wt-dec      Weight Decision

FIG. 23

WEIGHT MEASUREMENT SYSTEM, METHOD AND WEIGHT SENSOR

BACKGROUND OF INVENTION

1. Field of Invention

This invention relates to a system that measures weight in a seat of a motor vehicle, weight sensors or strain transducers used in the system and the calibration of the weight sensors. In particular, the invention relates to a method and system of calibrating weight sensors used in motor vehicles and to a transducer that can be used as a weight sensor in the system.

2. Description of Prior Art

Weight sensors are used in a motor vehicle seat to measure strain or stress as a result of weight in the seat. The amount of measured stress is processed with other information, such as in seat occupant positioning, to control primary and supplemental restraint systems, such as managed load limiters, pre-tensioners and/or side and frontal air bags. Accurate weight in seat information combined with supporting primary and supplemental restraints improves overall system decisions and performance of the system in protecting occupants of the vehicle should a crash occur.

Current system installations use on-line assembly and field personnel to calibrate the system. These systems use data sampling, performance history data and a one-time zero set or reference to achieve initial and ongoing calibrations. The one-time calibration is usually performed at the time of initial installation in the vehicle. This type of calibration is unlikely to capture a shift in zero set as a result of over stressing of the weight sensor during vehicle use, aging of components, and other drift causing factors that occur throughout the lifetime of the vehicle. Thus, such one-time calibration systems will over time result in a shift in weight measurement readings that increase the system error rate as the vehicle ages.

Weight sensors used for sensing weight in the seat of a motor vehicle have included pressure or bladder units, flexible membrane units, proximity sensor units or structural beam units, that generate a change in an electrical characteristic such as resistance or capacitance. These units typically include an elastomerically deformable element upon which is mounted a plurality of strain gauge elements. Each of the strain gauge elements has an electrical characteristic, such as resistance, capacitance or inductance that varies as the elastomeric element deforms under stress.

Conventional elastomeric beam transducers have generally been formed with a bending process. Stress is distributed by such transducers in a central region centered on a fore/aft axis, but offset from a lateral axis thereof. This has required the use of two strain gauge elements to capture positive and negative stress loads. Two strain gauges have complicated the system tasks of measuring weight, compensation, and calibration. This affects the complexity and cost of system hardware and software.

Thus, there is a need for a weight sensing system for a motor vehicle that has the capability of providing a calibration procedure and system that improves accuracy of the system over the lifetime of the vehicle. There is also a need for a weight sensor that distributes stress in a central region that is centered about a fore/aft axis, but without an offset from a lateral axis thereof.

SUMMARY OF INVENTION

A strain transducer according to the invention includes a body having two lands with an elastomeric beam in juxtaposition with the two lands. The mass of the elastomeric beam is less than the mass of either of the lands. The elastomeric beam has a region of minimum thickness and one or more regions of maximum thickness. An electrically resistive body is located on the elastomeric beam overlying the region of minimum thickness. First and second electrical contacts electrically contact spaced part locations of the resistive body, whereby deformation of the elastomeric beam results in a change in electrical resistance of the electrically resistive body between said first and second electrical contacts.

In some embodiments one or both of opposed surfaces of the elastomeric beam are arcuate. In some embodiments, the electrically resistive body is a thick film resistor that is adhered to an arcuate surface of the elastomeric beam.

In another embodiment, the strain transducer includes a resistive body disposed on an elastomeric beam with four equally spaced electrical contacts disposed thereon to define four electrical resistances of the body that are connected in a wheatsone bridge.

A method according to the invention automatically calibrates a characteristic of a weight sensor installed to sense weight of a seat in a motor vehicle that has a door and a seat belt with a buckle associated with the seat. The method determines if the seat is empty by means of the weight sensor, a spatial detector or a pressure sensor or the like. Next, the method determines if a condition is present, where the condition is a member of the group consisting of the door being open and the seat belt being unbuckled. If the seat is empty and the condition is present, a set of values of the characteristic that define a calibrated zero set value are established. The calibrated zero set value is then presented for use as a zero set for in seat weight measurements. The determining step, the establishing step and the presenting step are repeated for as long as the vehicle is in use.

More particularly, the method retains a first set of the established values as a reference set of values and a second set of values as a temporary set of values, if the second set of values exceeds a predetermined deviation from the reference set of values. The temporary set of values defines a modified zero set value reflecting drift of the weight sensors for the in seat weight measurements.

In a particular embodiment, a plurality of weight sensors are installed to sense the weight of the seat and the sets of values are derived from measurements of the electrical resistance of the plurality of weight sensors. According to one feature of the invention, the number of times a temporary set of values is established is limite during the time an open door condition is found present.

The weight measurement system of the invention includes a computer controller that performs the method of the invention.

BRIEF DESCRIPTION OF DRAWINGS

Other and further objects, ad vantages and features of the present invention will be understood by reference to the following specification in conjunction with the accompanying drawings, in which like reference characters denote like elements of structure and:

FIG. 23 is a table containing a legend of the abbreviations used in the flow diagrams of FIGS. 16 through 22.

DESCRIPTION OF PREFERRED EMBODIMENT

Figure 1:
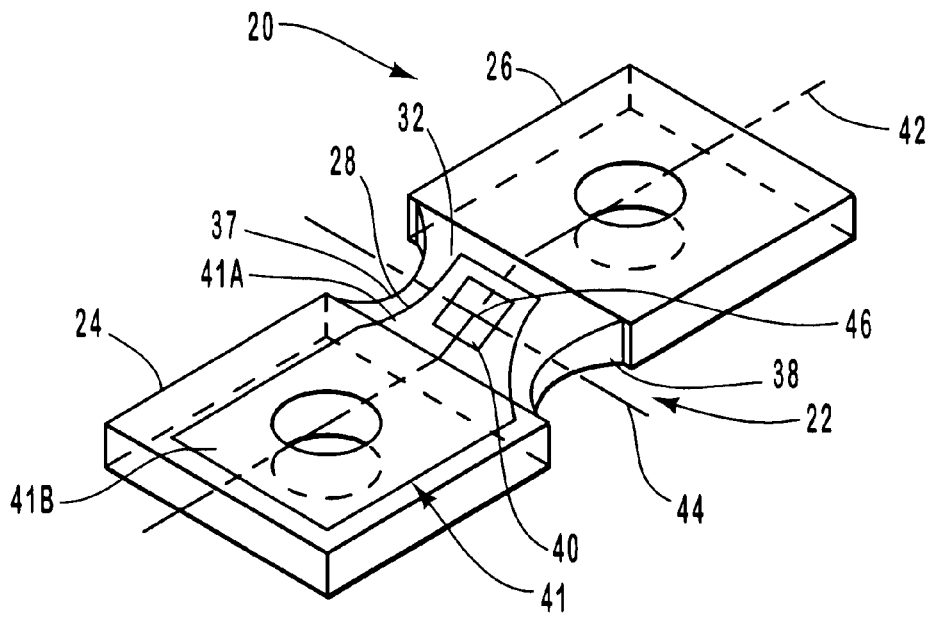
FIG. 1 is a perspective view of a strain transducer according to the invention.
Figure 2:
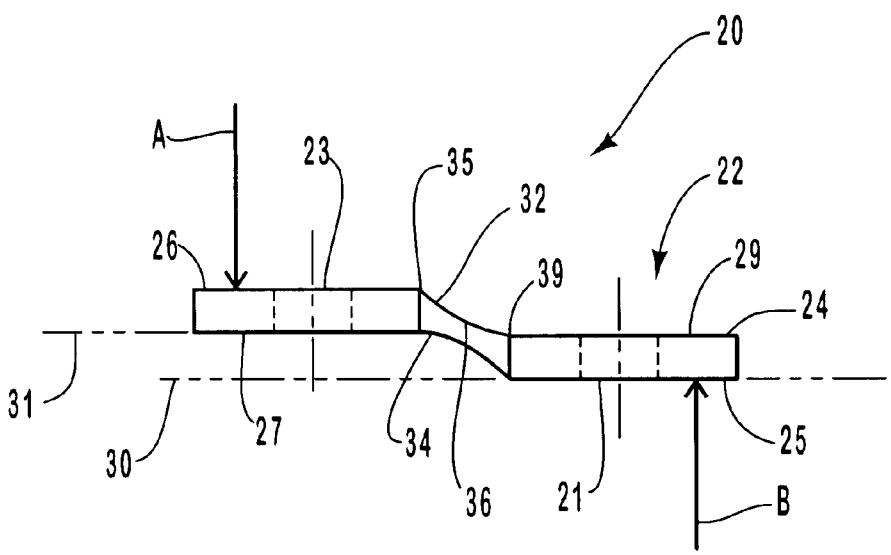
FIG. 2 is a side view of FIG. 1.

With reference to FIGS. 1 and 2, there is provided a strain transducer 20 according to the present invention. Transducer 20 has an integral body 22 and a strain gauge element 40. Integral body 22 includes a first land 24 and a second land 26 that are joined by an elastomeric beam 28 that deforms when stressed, but, due to its elasticity, returns to its original shape when the stress is removed.

First land 24 has a bottom surface 25 that lies in a plane identified by line 30 in FIG. 2. Second land 26 has a bottom surface 27 that lies in a plane identified by line 31. Planes 30 and 31 are substantially parallel. Elastomeric beam 28 joins first and second lands 24 and 26. Elastomeric beam 28 has a first surface 32 and a second opposed surface 34. First land 24 and second land 26 have masses that are each substantially larger than the mass of elastomeric beam 28. To this end, first and second surfaces 32 and 34 are shaped to produce a region 36 of minimum thickness and one or more regions of maximum thickness at its ends 35 and 39. Preferably, first and second surfaces 32 and 34 are arcuate and, more preferably, are concave, to produce a minimum thickness at region 36. Additionally, elastomeric beam 28 has notches 37 and 38 on either side to further reduce its mass.

Figure 5:
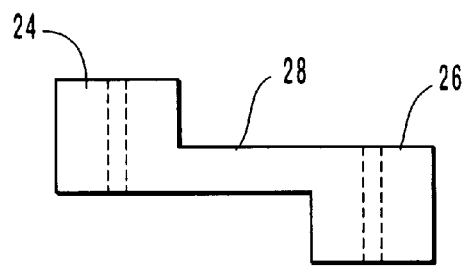
FIG. 5 is a side view of an alternate embodiment of a strain gauge element of the invention.
Figure 6:
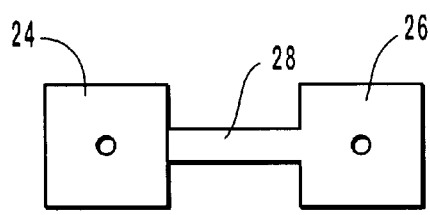
FIG. 6 is a top view of another alternate embodiment of a strain gauge element of the invention.

However, it will be appreciated by those skilled in the art that other shapes can provide beam 28 with a lower mass than lands 24 or 26. For, example, first surface 32 can be concave and second surface can be of any shape, such as a straight line, that produces a minimum thickness region. Alternatively, first surface 32 may include a concave notch of a V or U shape with second surface assuming any shape that yields a minimum thickness region at the apex of the V or U. Another example is shown in FIG. 5, in which lands 24 and 26 have large block shaped masses and elastomeric beam 28 has a narrow width. Another example is shown in FIG. 6, in which beam 28 may simply have a smaller lateral cross-section than that of lands 24 or 26.

Minimum thickness region 36 deforms with a slight bend when transducer 20 is subjected to stress as represented by force arrows A and B in FIG. 2. This deformation is sensed by strain gauge element 40 with a resultant change in electrical characteristic as described below. For mounting purposes, first land 24 has a hole 21 and second land 26 has a hole 23.

Strain transducer 20 can be any suitable alloy or polymer that can be formed such that elastomeric beam 28 is smaller than lands 24 and 26 and has a concentrated stress region needed for optimum performance and strength. Choice of material is dependent on the applied stress. For a low stress application, such as a low "g" or tilt sensor, the material could be a polymer, formed, for example, by a pressure polymer molding process. For a high stress application, such as a weight sensor in a motor vehicle, the material could be an alloy, formed, for example, by a coining or stamping process. Elastomeric recovery after applied stress can be enhanced with higher glass content for the case of a polymer or by hardening/heat treating for the case of an alloy.

Strain gauge element 40 is carried on a substrate 41 and is centered on the geometric center of elastomeric beam 28 that is represented by an intersection 46 of fore/aft axis 42 with a lateral axis 44. Preferably, strain gauge element 40 has a flat geometry, such as is produced by thick film, thin film or etched foil on substrate 41. Substrate 41 is bonded to elastomeric beam 28 and first land 24. For example, the bonding process may use a baking or curing of the substrate to an enamel paint finish on elastomeric beam 28. Substrate 41 may suitable be a printed wiring board or films made of polyester, polyethylene, polyvinyl, polyimide, or any other material with dielectric properties stable enough to carry strain gauge element 40.

Figure 3:
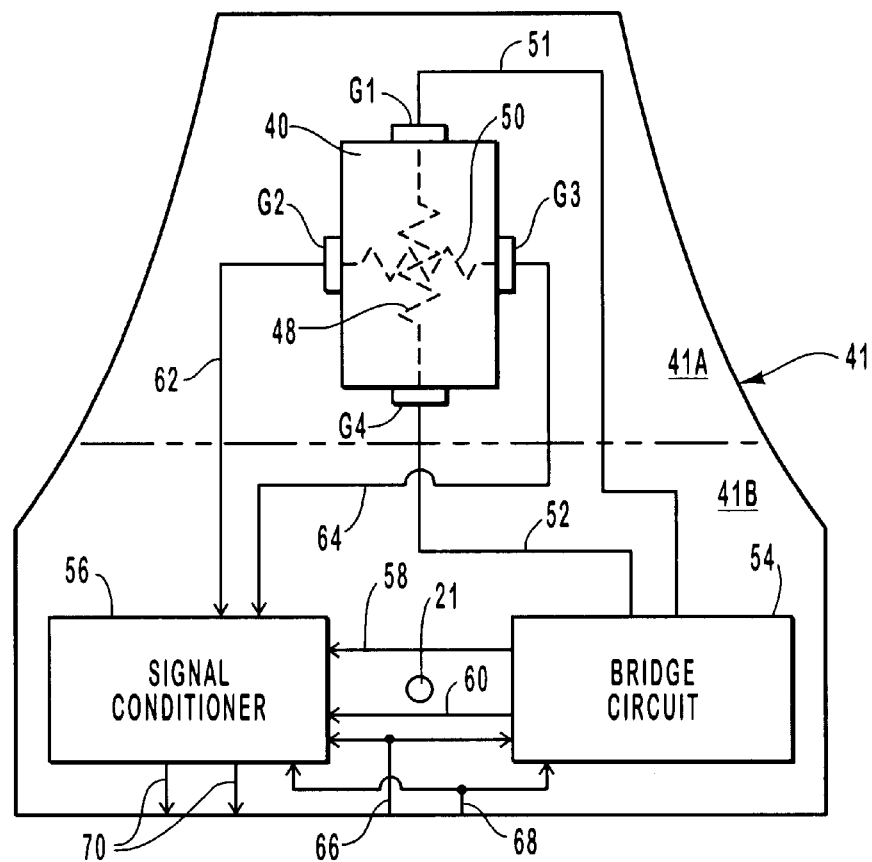
FIG. 3 is a plan view of the substrate that carries the strain gauge element of the FIG. 1 transducer and other circuit elements.

Referring to FIGS. 1 and 3, substrate 41 has a portion 41A that is disposed on elastomeric beam 28 and a second portion 41B that is disposed on first land 24. Strain gauge element 40 is disposed on substrate portion 41A. Strain gauge element 40 has a fore/aft resistance 48 defined by contacts G1 and G4 and a lateral resistance 50 defined by contacts G2 and G3. Substrate portion 41B carries a bridge circuit 54, a signal conditioner 56 and a number of electrical leads. Fore/aft resistance 48 is connected via leads 51 and 52 to bridge circuit 54. For example, bridge circuit 54 may be a wheatstone bridge with fore/aft resistance 48 forming one leg thereof. A pair of leads 58 and 60 couple the output of bridge 54 to signal conditioner 56. A pair of leads 62 and 64 connect lateral resistance 50 to signal conditioner 56. A pair of leads 66 and 68 provide operating voltage to signal conditioner 56 and to bridge circuit 54. Signal conditioner 56 has a plurality of output leads 70 for connection to the system controller described hereinafter. All of the aforementioned leads may be carried on substrate 41. Signal conditioner 56 includes circuitry for thermal compensation, transient dropout and amplification to provide suitable signals on output leads 70 for use by a system controller to be described below.

Figure 4:
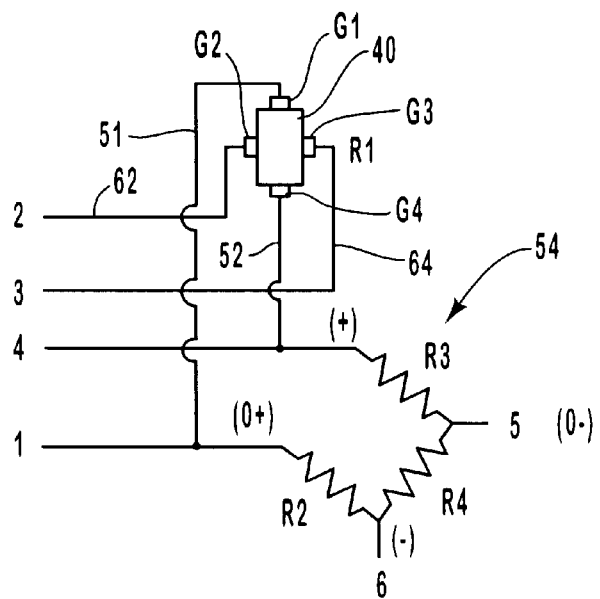
FIG. 4 is a schematic circuit diagram of the electrical components of FIG. 3.

Referring to FIG. 4, wheatstone bridge circuit 54 includes strain gauge element 40, (also designated as resistor R1) and resistors R2, R3 and R4. Contacts G1, G2, G3 and G4 are coupled via connections 51, 62, 64 and 52 to circuit points designated as 1, 2, 3 and 4. Wheatstone bridge 54 also has circuit points 5 and 6 as well as circuit points 1 and 4. Circuit points 1 and 5 are coupled to receive operating voltage from the electrical system of a motor vehicle. Circuit points 1 through 4 are coupled to a weight measurement system for measurements of the resistance of strain gauge element 40 for calibration as well as under various loading stresses that occur during operation of the motor vehicle. Resistors R2, R3 and R4 are used for temperature compensation.

Figure 9:
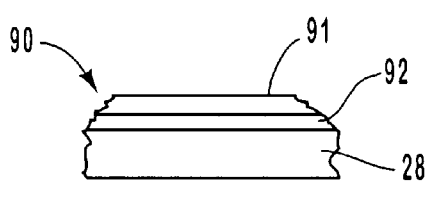
FIG. 9 is a cross-sectional view of a portion of the strain gauge elements of FIGS. 6 and 7.

Referring to FIG. 9, a strain gauge element 90 is shown constructed of a layer of resistive material 91 disposed on a layer of electrically insulating material 92 that is disposed on a surface of elastomeric beam 28. This construction can be formed either with thick film fabrication techniques or with thin film fabrication techniques. The inventors have discovered that a strain gauge element formed with this construction is extremely stable for high stress applications, such as sensing weight in seats of motor vehicles and can be used by itself without additional thermal compensation elements.

Figure 7:
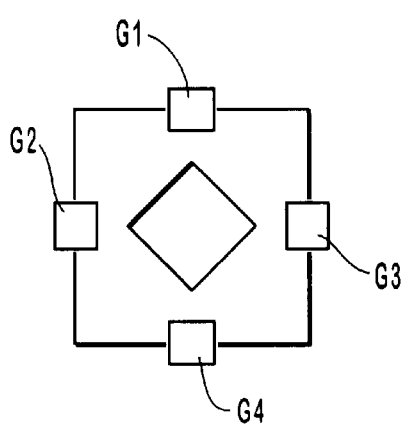
FIG. 7 is a plan view of another alternate embodiment of a strain gauge element of the invention.
Figure 8:
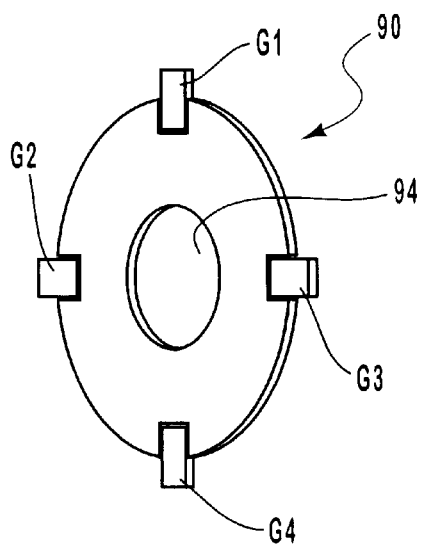
FIG. 8 is a plan view of another alternate embodiment of the strain gauge element of the invention.
Figure 10:
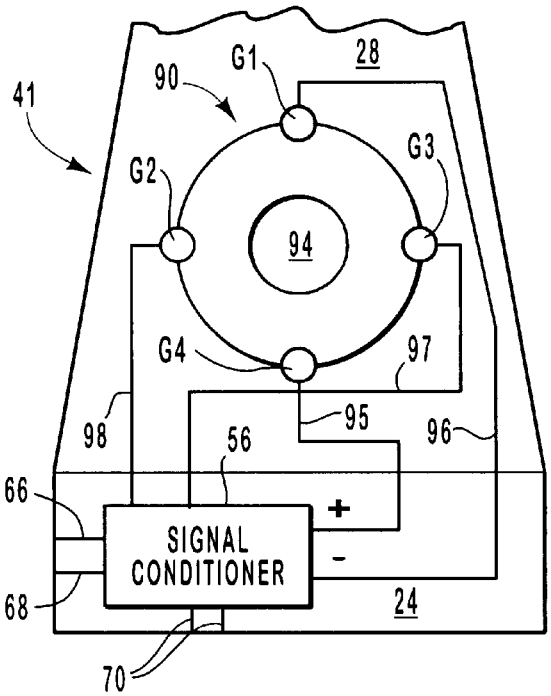
FIG. 10 is a plan view of another alternate embodiment of the strain gauge element and of a circuit for obtaining resistance measurements therefrom.
Figure 16:
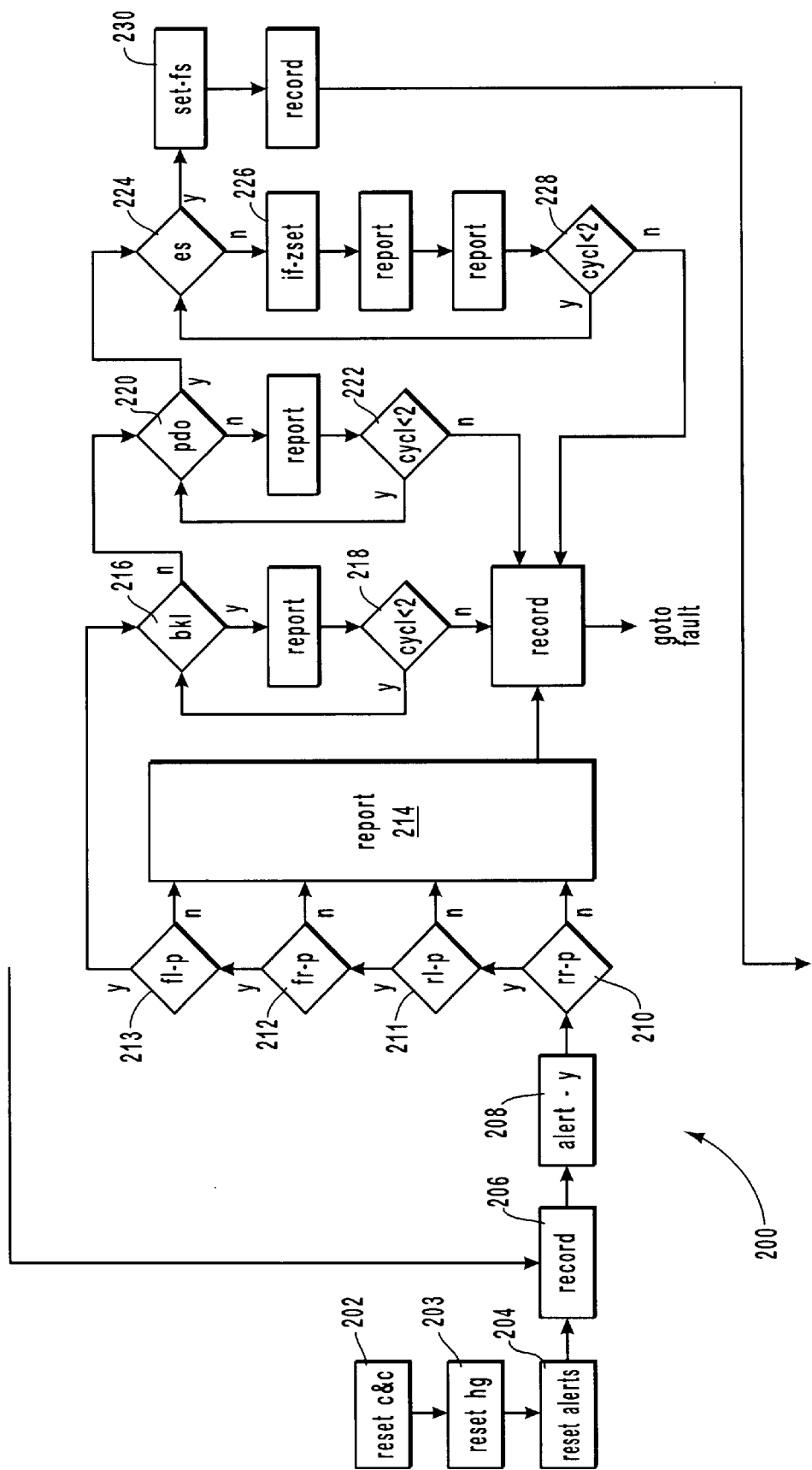
FIG. 16 is a flow diagram of the preinstall portion of the FIG. 15 program.

Referring to FIGS. 7, 8 and 16 strain gauge element 90 is shown with in three different resistive body shapes with a centrally located void 94 and contacts G1, G2, G3 and G4 disposed at edge locations similar as to strain gauge 40 of FIGS. 3 and 4. Strain gauge element 90 has been found to be so stable that it can be used as a full bridge in stress as shown in FIG. 10. This is in contrast to strain gauge 40 of FIGS. 3 and 4, which is used as one leg of a wheatstone bridge for measurements of resistance between contacts G1, G2, G3 and G4. In theory, a bridge is thermally compensated, but in reality it is not because of different thermal expansion characteristics and voltage drops of the various materials used in the strain gauge. Typically, the elements of a bridge are not completely equal due to different thermal expansions stresses, and the like. The interconnects, traces or wires all contribute to variation in response of the different "legs" of the bridge. This has required auxiliary thermal compensation.

The resistances between contacts G1, G2, G3 and G4 of resistive body 90 when connected as the legs of a bridge are very stable as they are located in the same area, made of the same material and processed at the same time.

Void 94 can be trimmed during or after fabrication to balance the resistances G1–G2, G1–G3, G2–G4 and G3–G4. Variations due to fabrication may also occur due to rotation of contacts G1, G2, G3 and G4, of void 94 or of element 90 itself. Using the ovoid shape of FIG. 8 or the round shape of FIG. 10 can minimize these variations that are most prevalent for the square shape of FIG. 7.

Referring to FIG. 10, strain gauge element 90 is connected as a wheatsone bridge with resistive body resistances G1–G2, G1–G3, G2–G4 and G3–G4 forming the four legs of the bridge. A signal conditioner 56 is connected by leads 95, 96 97 and 98 to contacts G1, G2, G3 and G4, respectively. Leads 66 and 68 provide operating power to signal conditioner 56 and to strain gauge element 90 via leads 95 and 96. Signal conditioner 56 has a plurality of output leads for connection to the system controller described hereinafter.

Figure 11:
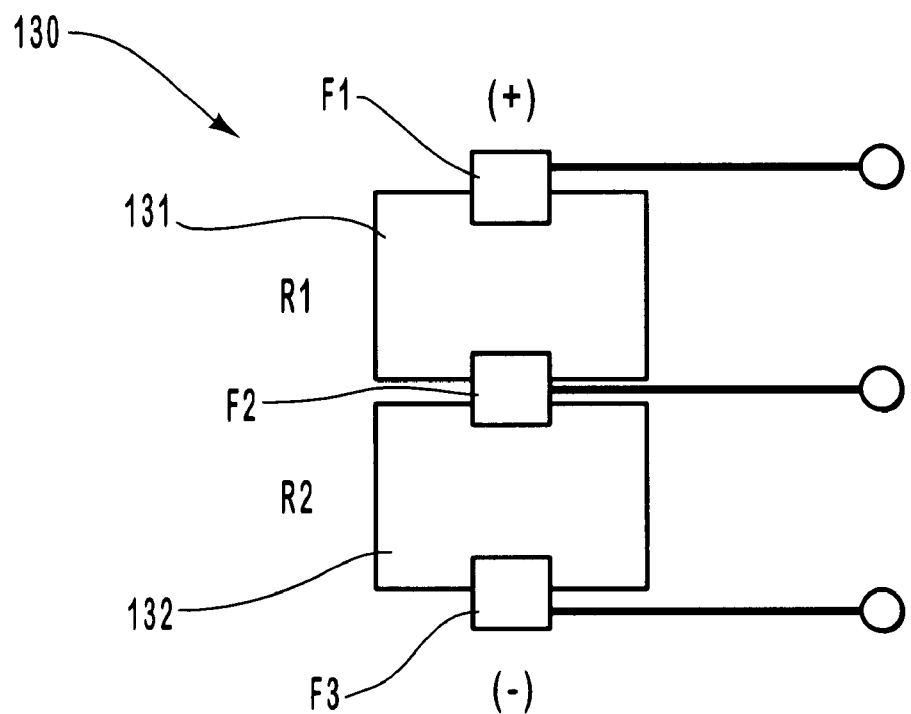
FIG. 11 is a plan view of another alternate embodiment of the strain gauge element and of a circuit for obtaining resistance measurements therefrom.

Referring to FIG. 11, an alternate strain gauge element 130 has a first resistive body 131 and a second resistive body 132 spaced apart from one another. Resistive bodies 131 and 132, are formed with a construction of the type shown in FIG. 9. An electrical contact F2 is in contact with an edge of resistive body 131 and an edge of resistive body 132. An electrical contact F1 is in contact with an opposite edge, of resistive body 131 and an electrical contact F3 is in contact with an opposite edge of resistive body 132.

With an electrical voltage applied across contacts F1 and F3, a resistance R1 of resistive body 131 is measured between contacts F1 and F2 and a resistance R2 is measured between contacts F2 and F3. With R1 and R2 being substantially equal for zero stress, the voltage between contact F2 and either contact F1 or F3 will be one half the voltage across contacts F1 and F3. Deviations from this value are due to stress.

It will be apparent to those skilled in the art that strain gauge element 130 could be a single resistive body with electrical contact F2 disposed centrally thereon to achieve substantially equal values of R1 and R2. Also, contacts F1, F2 and F3 of FIG. 11 or contacts G1, G2, G3 and G4 of FIGS. 7 through 10 can alternatively be disposed entirely on the resistive body instead of straddling an edge thereof.

Figure 12:
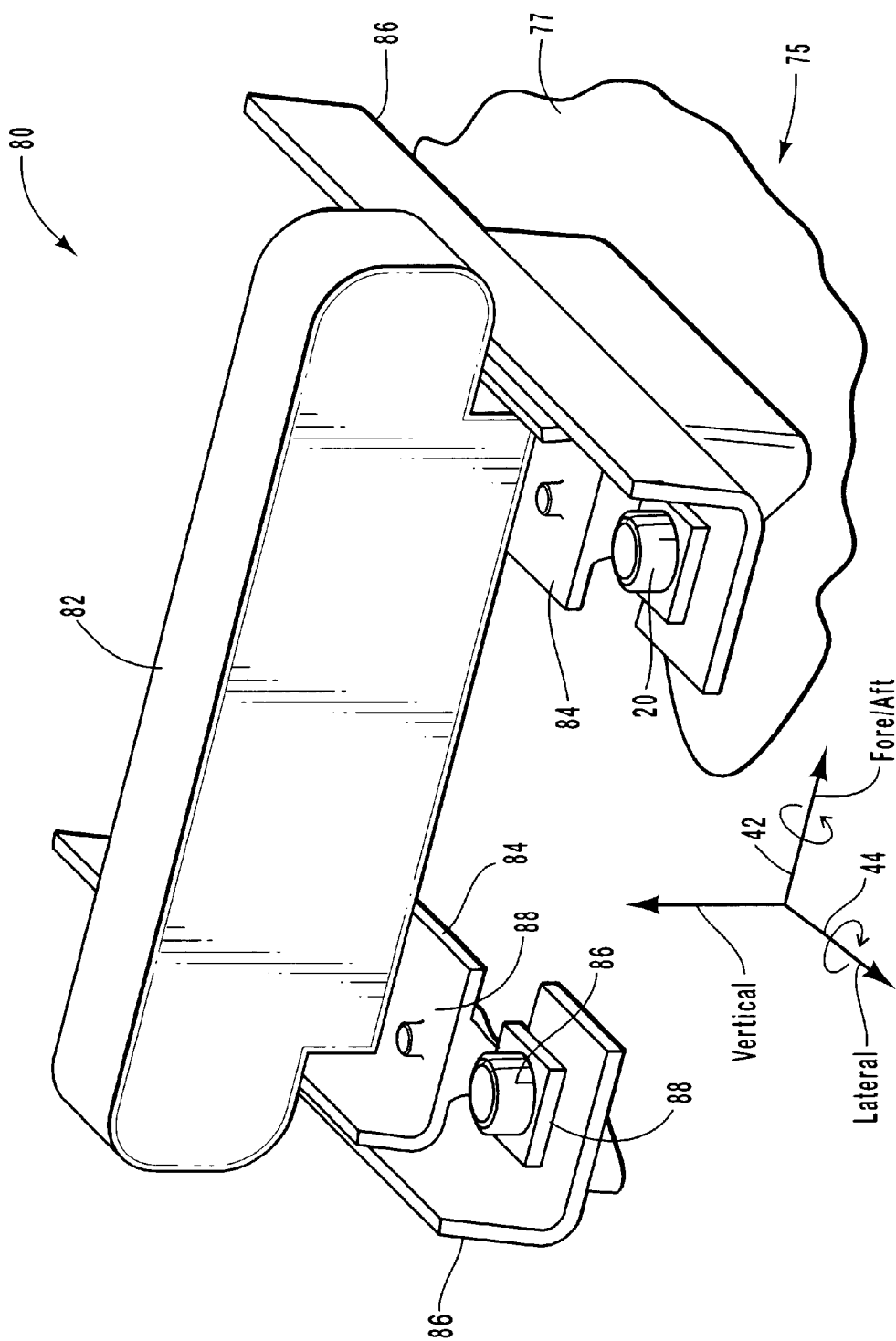
FIG. 12 is a perspective view of a portion of a motor vehicle with a seat that contains a plurality of the FIG. 1 strain transducers.

Referring to FIG. 12, a plurality of transducers 20 are shown in a weight sensing application for a motor vehicle 75 of which only a portion of a floor 77 and a portion of a seat 80 are shown. Seat 80 includes a seat cushion 82, a seat bucket 84 and a pair of seat tracks 86. Though seat bucket 84 is shown as having two side members, it also includes front and rear members (not shown) arranged with the side members to form a rectangular bucket to support seat cushion 82. Seat tracks 86 are mounted on floor 77.

Transducers 20 mount seat bucket 84 to seat tracks 86. Although only two transducers 20 are shown in FIG. 12, preferably three or more transducers are used to obtain a reasonably accurate measurement of any weight in seat 80. For a bucket type seat, preferably four transducers 20 are used, two are located fore as shown in FIG. 12 and the other two (not shown) are located aft.

Fore/aft axis 42 and lateral axis 44 are shown in FIG. 12 together with a mutually perpendicular vertical axis 43. Transducers 20 sense weight forces A and B as applied along vertical axis 43.

Figure 13:
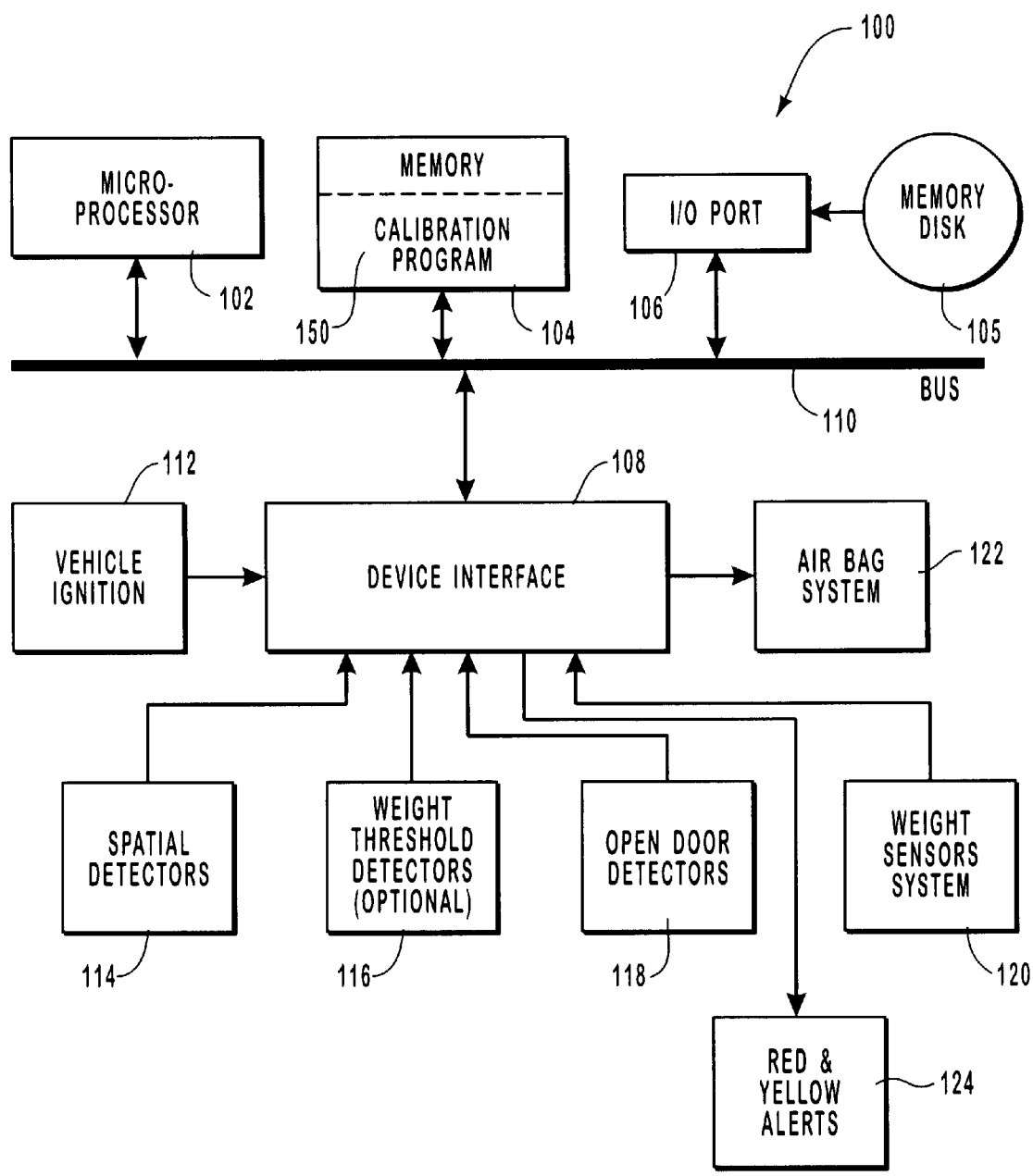
FIG. 13 is a block diagram of a weight in seat measurement system for a motor vehicle that provides calibration according to the present invention.

Referring to FIG. 13, a weight measurement system 100 according to the present invention includes a microprocessor 102, a memory 104, an input/output (I/O) port 106 and a device interface 108 that are all interconnected by a computer bus 110. Device interface 108 is connected with a motor vehicle ignition device 112, a spatial detector device 114, an optional weight threshold detector 116, an open door detector 118, a weight sensor system 120, an air bag system 122 and red and yellow alerts 124.

Microprocessor 102 under control of one or more programs stored in memory 104 processes data received from vehicle ignition device 112, spatial detector 114, optional weight threshold detector 116, open door detector 118 and weight sensor system 120 to control air bag system 122 and/or other vehicle occupant restraints.

In accordance with the present invention, a calibration program 150 is stored in memory 104. Calibration program 150 is operative to control microprocessor 102 to calibrate the weight in seat measurement system at the time of installation as well as at any time throughout the motor vehicle life without the need for a visit to a service center.

Programs for weight measurement system 100 including calibration program 150 may be loaded into memory 104 via I/O port 106 from a memory disk device 105. That is, calibration program 150 is stored on memory disk device 105 and loaded into memory 104 at a suitable time, such as the time of assembly.

Vehicle ignition device 112 provides an output signal that signifies whether the vehicle ignition is on or off. Spatial detector 114 provides an output signal that signifies if an occupant is in the seat. Weight threshold detector 116 provides an output signal that signifies if there is a weight in the seat that exceeds a threshold weight. For example, the threshold weight may be 6 kilograms. If the weight of the seat is less than the threshold weight, the seat is considered empty. Open door detector 118 produces an output signal that signifies if the door is unlatched. Preferably, the door is adjacent the seat being measured for weight. Weight sensor device 120 produces one or more output signals that signifies the amount of weight in a seat. Air bag system 122 is a conventional air bag system that is controllable to release a frontal or a side bag.

Red and yellow alerts 124 provide a visual indication of the status of weight measurement system 100. For example, a yellow alert can signify that a calibration is underway and a red alert can signify that weight measurement system 100 has a fault.

Device controller 108 includes circuitry that can interface with analog signals or digital signals produced by or used by devices 112 through 122 and convert such signals to a form usable by self-calibration system 100. Thus, device interface 108 includes circuitry for analog to digital conversion, amplification, signal shaping, level shifting and the like.

Figure 14:
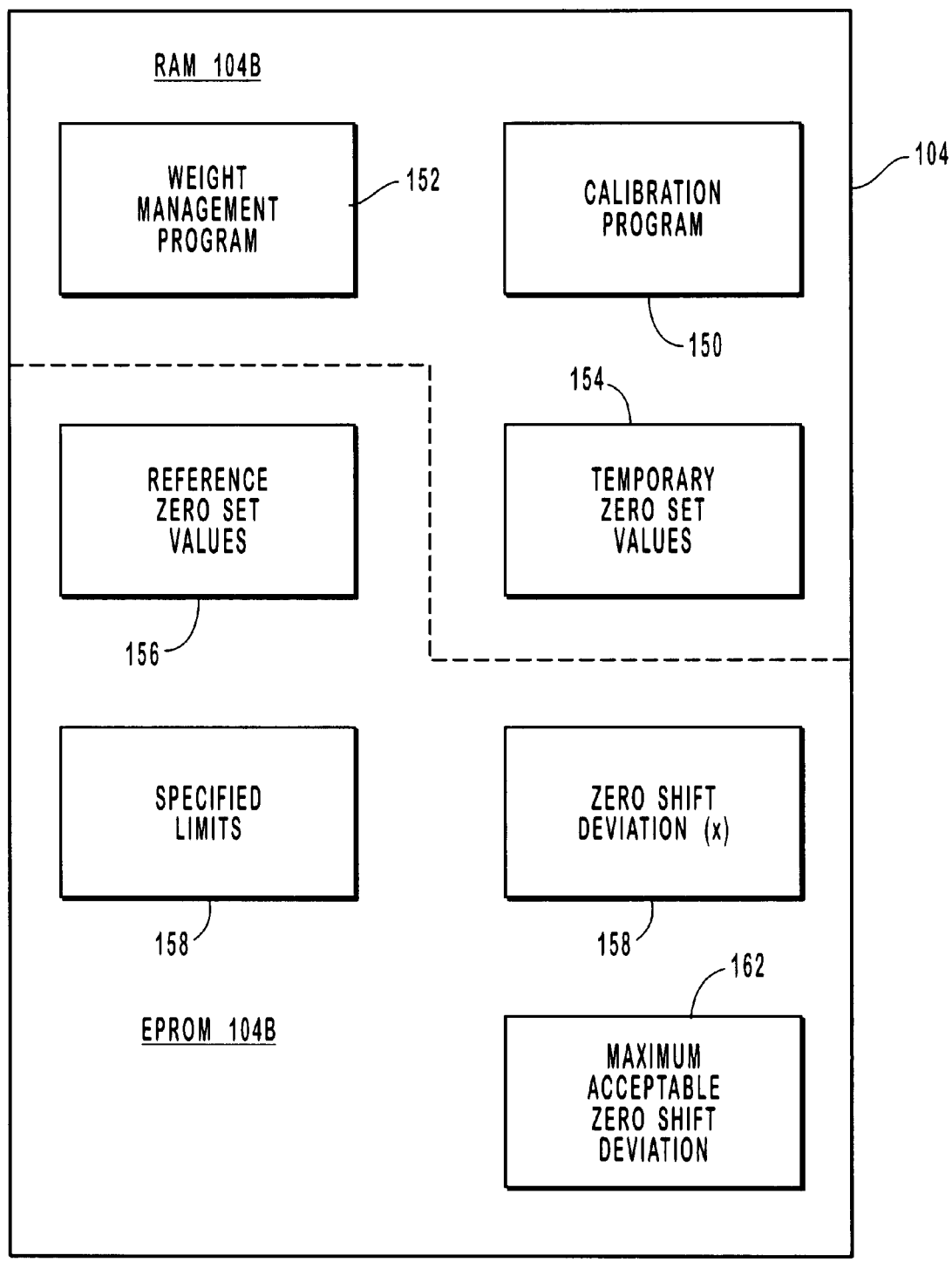
FIG. 14 is a block diagram of the memory of the FIG. 13 system.

Referring to FIG. 14, memory 104 includes calibration program 150, a weight management program 152, a temporary zero set buffer 154, a reference zero set buffer 156, a specified limits buffer 158, a zero shift deviation buffer 160 and a maximum acceptable zero shift limit buffer 162. Memory 104 can suitably be a random access memory (RAM) or may be divided into a RAM 104A and an erasable programmable read only memory EPROM 104B as shown in RIG. 7. Buffers 154 through 160 are used by calibration program 150 as discussed below.

When vehicle 75 is not in use, calibration program 150 is in a sleep mode in which system 100 draws less power, thereby preventing excessive vehicle battery drain. When a wake upevent occurs, calibration program 150 enters a factory install mode, a diagnostic mode or an active weight mode. The wake up event may, for example, be the opening of a vehicle door or the turning on of the vehicle ignition.

Once weight measurement system 100 has been calibrated by the factory install mode, the diagnostic mode and active weight mode operate throughout the life time of motor vehicle 75 automatically taking weight sensor measurements for the purpose of recalibrating zero set or managing occupant restraint systems with weight management program 152. When in the factory install mode or the diagnostic mode, weight measurements are taken only if certain conditions are present. These conditions are empty seat, door open and seat belt unbuckled. These conditions assure a calibration window for taking measurements while the seat is unoccupied with either an occupant or an object.

Figure 15:
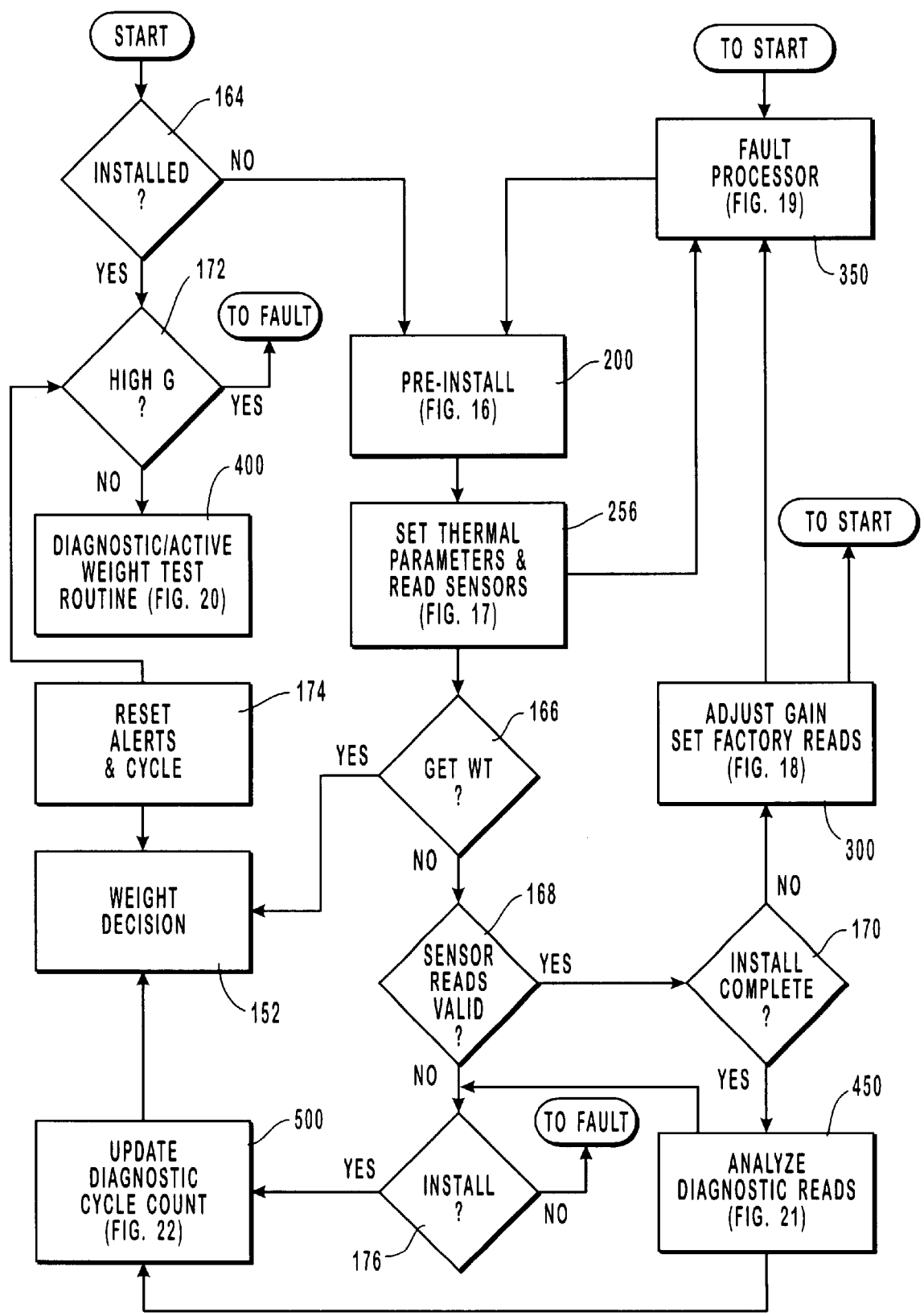
FIG. 15 is a flow diagram of the calibration program of the FIG. 13 system.

Referring to FIG. 15, calibration program 150 will now be described for the front right passenger seat of vehicle 75. It will be apparent to those skilled in the art that other seats in the vehicle can similarly be calibrated. Calibration program 150 begins at step 164 with a determination of whether weight measurement system 100 has been factory calibrated or a fault has occurred. If not installed or if a fault has occurred, calibration program 150 enters a factory install sequence that begins with a preinstall routine 200. Preinstall routine 200 verifies that the seat is empty, the passenger door is open and the seat belt buckle is unbuckled. If these conditions are met, a valid weight measurement window exists.

Calibration program 150 then enters a set thermal parameters and read sensors routine 250 that evaluates the temperature conditions as sensed by thermal resistors R2, R3 and R4 of FIG. 4 and reads the resistance values of the weight sensors of the passenger seat. The next step 166 determines if system 100 is in or has entered the active weight mode since the weight measurement window started.

If not, step 168 determines if the sensor reads are valid by checking the current status of the buckle, passenger door and seat. If valid, step 170 determines if system 100 has been factory installed. If not, calibration program 150 enters an adjust sensor gain and set factory reads routine 300 that records the reference zero set values 156 in EPROM 104B. If routine 300 is completed without a fault, calibration program 150 returns to start. If a fault occurs during either routine 250 or routine 300, calibration program 150 enters a fault processing routine 350. An example of a fault is the weight sensor reads being outside of specified limits 158 during routine 250 or being outside zero shift limits 160 during routine 300. Fault processing routine 350 processes the faults and then calibration program 150 returns to start.

Once calibration program 150 has completed a factory install mode, it subsequently operates in diagnostic mode or weight measurement mode unless weight sensors 20 are subject to a high stress (a high g event), passenger seat 80 is removed or one or more of weight sensors 20 have to be replaced. When a wake up event occurs subsequent to a factory install mode, step 164 will determine that factory install has occurred. Step 172 determines if a high g event has occurred. If so, calibration program 150 enters fault processing routine 350. If not, calibration program enters a diagnostic/active weight test routine 400. Routine 400 determines if a valid weight measurement window exists. If not, routine 400 sets a flag that signifies that active weight mode is on and that the most recently recorded temporary zero set values are to be used. Whether routine 400 determines a valid weight measurement window exists or that active weight mode is to be set, calibration program 150 proceeds to set thermal parameters and read sensors routine 250.

Routine 250 first sets the thermal parameters. If the active weight mode flag has been set, routine 250 ends. Step 166 will determine active weight mode. Weight management program 152 then operates to take weight measurements that control decisions for operation of the passenger restraints during operation of vehicle 75. When a set of measurements have been recorded, step 174 resets system alerts 124 and cycle counters. While vehicle 75 is being operated, calibration program 150 repeats the sequence of step 172, routines 400 and 250, step 166, program 152 and step 174.

If diagnostic/active weight routine 400 determines that a valid weight measurement window is present, routine 250 sets the thermal parameters and reads the current resistance values of weight sensors 20. If these current values are not within acceptable limits 158, calibration program 150 proceeds to fault processing routine 350. If the current resistance values are within the acceptable limits, step 166 will determine that the active weight flag has not been set. Step 168 verifies whether the weight measurement window is still valid. If so, step 170 will determine that factory install is completed. Calibration program 150 then enters an analyze diagnostic reads routine 450. Analyze diagnostic reads routine 450 compares the current weight sensor reads with reference zero set values 156. If the comparison results in a deviation greater than zero shift value 160, temporary zero set values 154 are updated to the current weight sensor reads. If not, temporary zero set values 154 are not changed. Calibration program 150 then enters an update diagnostic cycle count routine 500. Routine 500 assures that a limited number of consecutive diagnostic sequences will be performed for a continuous open door condition.

If step 168 determines that weight measurement window is not valid for either the factory install mode or the diagnostic mode, step 176 determines if factory install is complete. If not, calibration program enters fault processing routine 350. If so, calibration program 150 enters change open door count routine 500.

Referring to FIGS. 16 through 22, abbreviations used in these FIGS. are defined by the legend that appears in FIG. 23. With reference to FIG. 16, preinstall routine 200 for the factory install mode begins at step 202 with a reset of all counters and cycles. The cycles are minimally set to allow three consecutive cycles. In the event during one of these cycles, a fault corrects itself, the event will be recorded and the cycle counter reset, thereby resulting in normal operation of the factory install mode. Step 203 resets a high g flag that may have been set by the occurrence of a high g event. As noted in the description of FIG. 15, step 172 will prevent initiation of the diagnostic or the active weight modes while the high g flag is set. This requires that vehicle 75 be brought to a service center for inspection, any necessary repair and a factory install mode.

Step 204 resets any alerts 124 that may have been set. Step 206 records the activity of steps 202 through 206 to provide a history. Other steps identified as record in FIGS. 16 through 22 perform a similar function and will be ignored in the description that follows. Step 208 sets yellow alert 124 that indicates system 100 is undergoing a systems check. In the event of a non-recoverable fault, yellow alert 124 is turned off and red alert 124 is turned on. Upon a successful systems check (factory installation or calibration), yellow alert 124 is reset.

Steps 210, 211, 21, and 213 validates the presence of an acceptable weight sensor or cell 20 at the rear right, rear left, front right and front left locations, respectively of seat 80. If a weight sensor is absent or out of an acceptable resistance range, the condition triggers a report 214 identifying the detected fault. Other steps identified as report in FIGS. 16 through 22 perform a similar function and will be ignored in the description that follows. In this case, report 214 is followed by a fault being recorded and a jump to fault processing routine 350.

If steps 210 through 213 determine that all weight sensors 20 are present and acceptable, steps 216, 220 and 224 determine if certain conditions are present that define a valid weight measurement window. These conditions are an unbuckled seat belt, an open passenger door and an empty seat determined by steps 216, 220 and 224, respectively. A latched seat buckle can possibly affect the accuracy of seat weight measurements. An open passenger door can signify that there is a brief window of opportunity to calibrate. An empty seat validates the window of opportunity. A latched seat buckle or a closed passenger door will not result in an immediate fault. Instead, the condition is reported via a monitor (not shown), to give the operator an opportunity to correct the fault. For example, the service personnel may have inadvertently left the seat belt latched or the passenger door closed. Thus, steps 218 and 222 determine if cycle counters have a value of less than 2. If so, the fault is communicated to the operator via a monitor. If the fault condition is not removed before the cycle count equals 2, the fault is recorded and calibration program 150 enters fault processing routine 350.

Step 224 tests the weight of the Empty seat as a sum of the output values of the individual weight sensors 20. If the sum is within a deviation of X% from the aforementioned threshold value, the seat is considered empty and the calibration will proceed. Step 230 establishes that the weight measurements to be taken or read will be factory set or permanent reads. That is, they will constitute reference zero set values 156. On the other hand, if step 224 determines that the seat is not empty, step 226 assigns a temporary zero set. Step 228 checks to o see if the cycle count is less than 2. If so, step 224 will validate an empty seat due to the temporary zero set by step 226. This will allow the factory calibration to proceed. This feature allows the system to adapt to varying assembly/installation processes, thereby providing flexibility and control of the process with minimal attendant involvement.

It will be appreciated by those skilled in the art that other conditions, such as interior spatial sensing, in seat proximity/usage sensors can also be used to validate empty seat.

Figure 17:
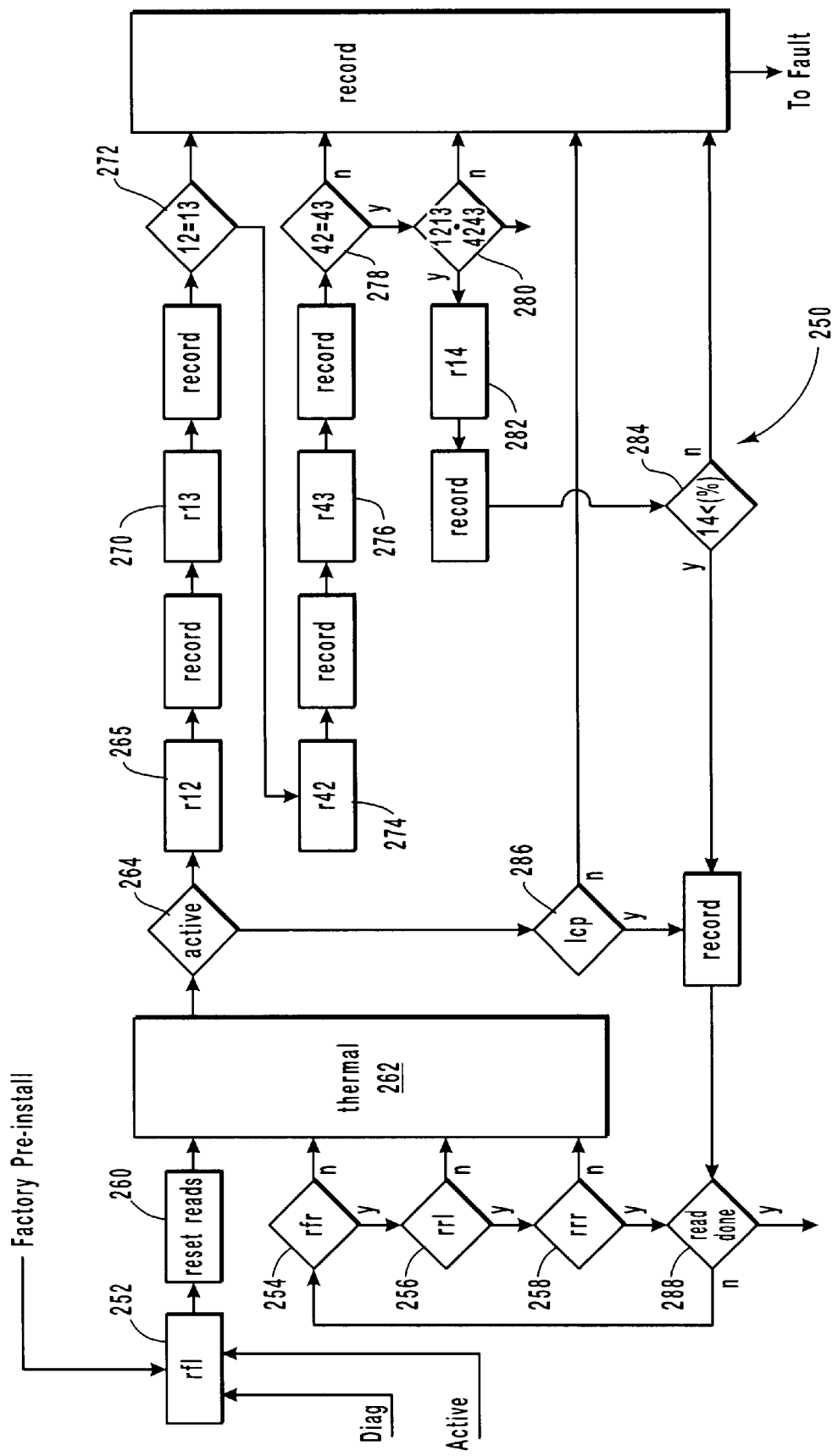
FIG. 17 is a flow diagram of the set thermal and read sensors portion of the FIG. 15 program.

Referring to FIG. 17, set thermal parameters and read sensors routine 250 begins at step 252. Step 252 is entered from step 230 of factory preinstall routine 200 or from diagnostic/active weight test routine 400. Step 252 initiates the first of four weight sensor reads with the front right sensor. Step 260 resets the buffers containing previous reads for the sensors but does not reset temporary zero set values 154. Step 262 sets thermal compensation parameters for the sensor reads by measuring the resistance values of resistors R2, R3 and R4. Step 264 determines if the active weight mode flag is set. This flag will not be set during either a factory install or diagnostic calibration.

Step 268 reads the resistance between sensor contacts G1 and G2 and step 270 reads the resistance between sensor contacts G1 and G3. Step 272 analyzes the relationship between the grid pairs G1, G2 and G1, G3. This relationship must be within a specified, tolerance in order for the calibration process to proceed. If within the specified tolerance, step 274 reads the resistance between sensor contacts G4 and G2 and step 276 reads the resistance between sensor contacts G4 and G3. Step 278 compares the relationship between the grid pairs G4, G2 and G4, G3. If within the specified tolerance, step 280 compares the relationship between sensor contacts G1, G2, G3, G4 and G4, G2, G4, G3.

If steps 272, 278 or 280 determine their respective comparisons as outside the specified tolerance, a fault condition is recorded and calibration program 150 proceeds to fault processing routine 350. If the fault condition persists after consecutive attempts to clear it, calibration program 150 will fault the sensor. Examples of faults include a degraded resist element or interconnect or an environmental condition, such as moisture.

If all grid relationships are within the specified tolerance, step 282 reads the resistance between sensor contacts G1 and G4. Step 284 then analyzes the resistance between sensor contacts G1 and G2 with respect to a stored calculated G1, G4 empty seat signature. During factory install mode, if within a specified tolerance range, the G1, G4 value is recorded as reference zero set value 156. However, the original calculated stored value is always maintained and used as a default in the event factory installs are needed in the future.

Step 288 then determines if all reads are done. For this case, only the front right sensor has been read so step 288 determines another read is needed. Step 254 determines if the front right sensor has been read. If not, steps 262 through 284 are repeated for the front right sensor. If so, step 256 determines if the rear left sensor has been read and so on until step 288 determines that all sensors have been read.

If step 264 determines that the active weight flag is set, step 286 verifies that all sensors are present. If not, a fault is recorded and fault processing routine 350 is entered. If step 286 determines that all sensors are present, step 288 determines that there are no sensors to be read.

Figure 18:
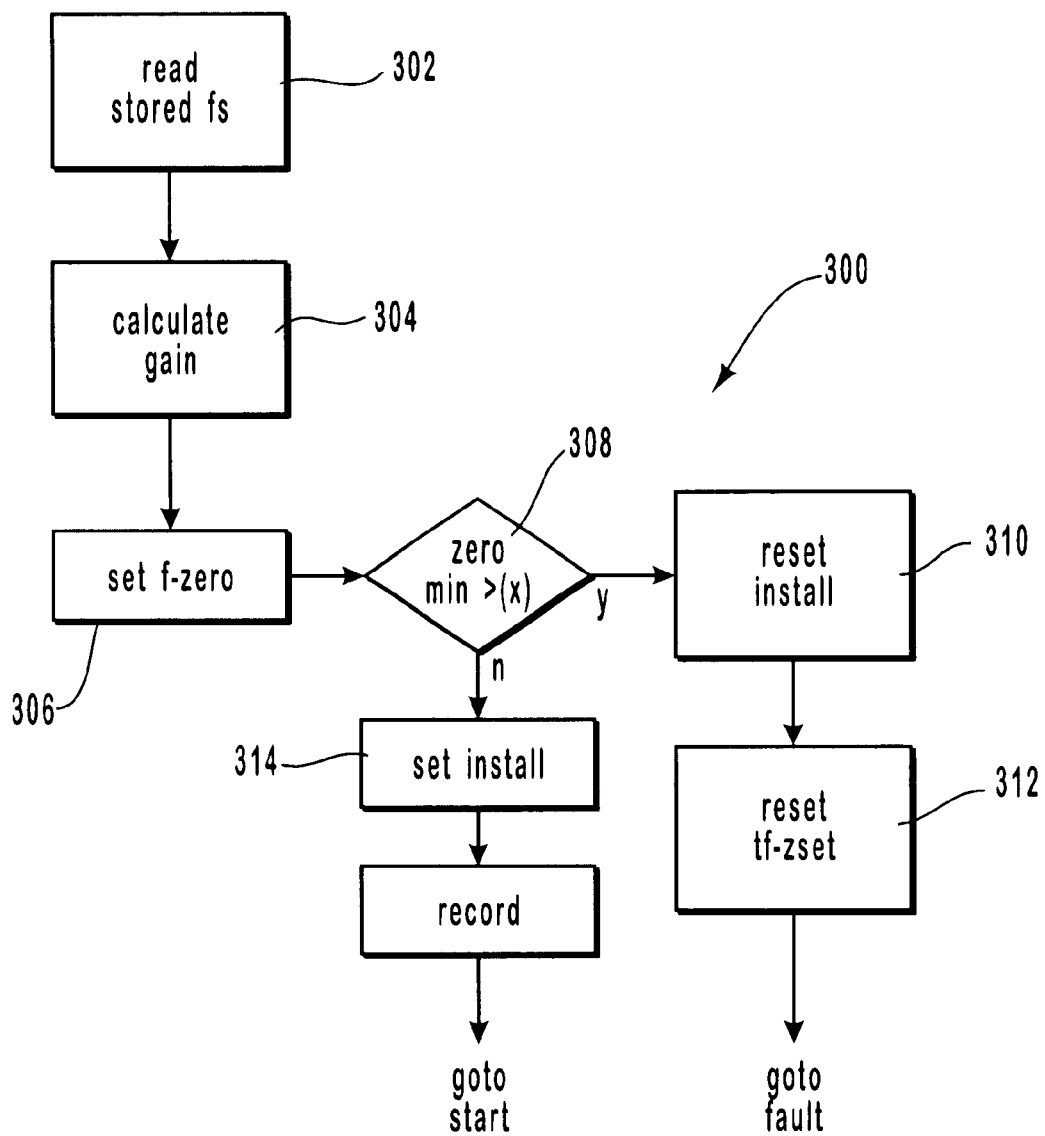
FIG. 18 is a flow diagram of the set factory reads portion of the FIG. 15 program.

With reference to FIG. 15, at this point in a factory install mode, steps 166, 168 and 170 are performed and gain adjust and set factory reads routine 300 is entered. Referring to FIG. 18, gain adjust and factory set routine 300 begins at steps 302 and 304 with reading the values measured and stored by set thermal and read sensors routine 250 and calculating a gain factor for each sensor. Step 306 averages all of the sensor reads of contacts G1, G4 and determines a zero shift (deviation from the specified zero shift). If this deviation exceeds a tolerance limit of x, step 310 resets install. For example, x may minimally be about 3 kilograms Step 312 then reset the temporary reset (if set at step 226 of FIG. 16) and, fault processing routine 350 is entered. If step 308 determines that the zero shift is within the tolerance limit, step 314 sets the reference zero set values 156. Calibration program 150 then returns to start.

Figure 19:
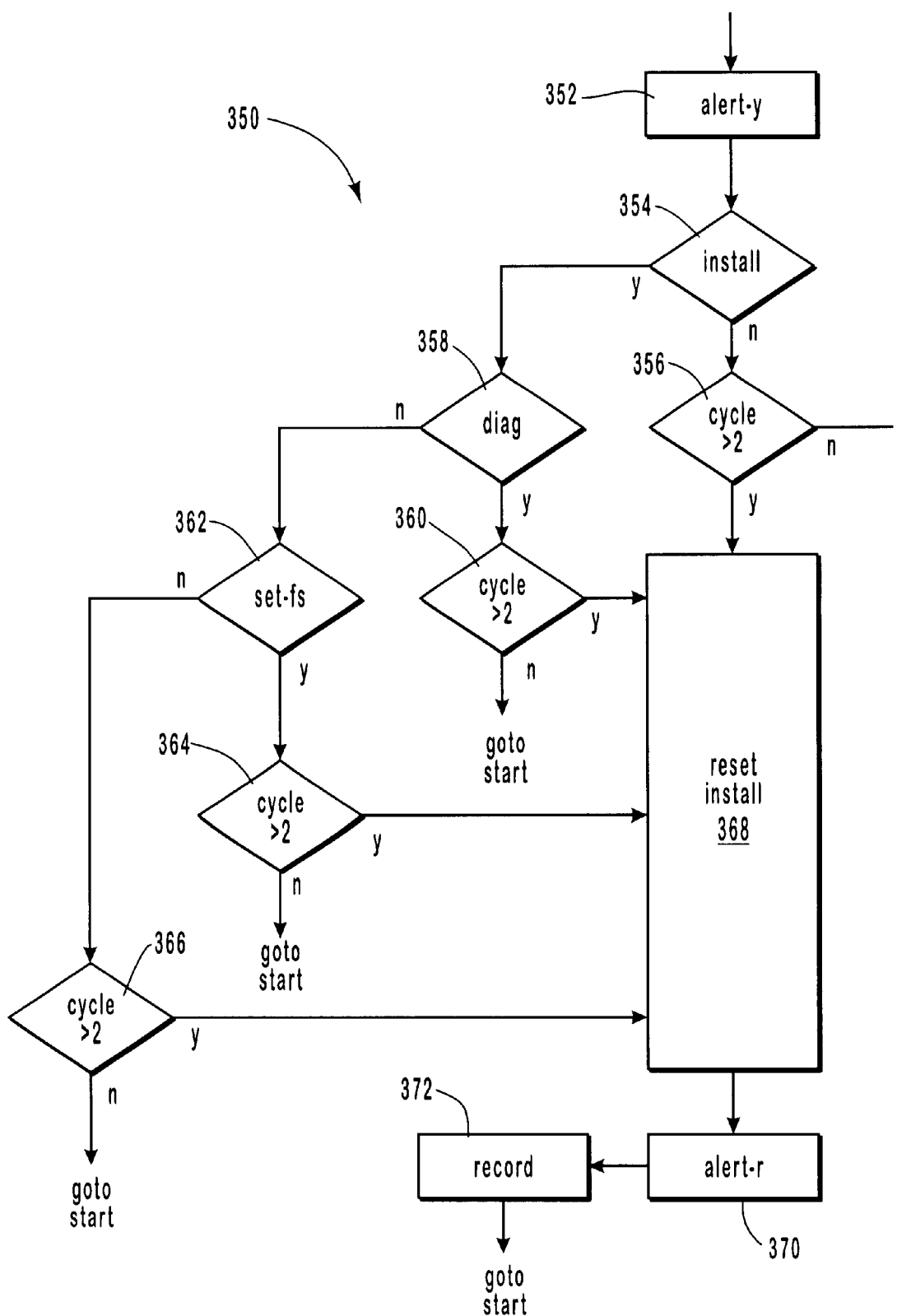
FIG. 19 is a flow diagram of the fault processing portion of the FIG. 15 program.

Referring to FIG. 19, fault processing routine 350 begins at step 352 with setting yellow alert 124. Step 354 determines if factory install is complete. Fault processing routine 350 allows three cycles to occur before setting a system fault that requires operator intervention. Thus, cycle counters 356, 360, 364 and 366 test for cycle greater than two. If so, the fault has occurred for the third cycle. If the fault occurred during factory install mode, factory install is not complete. Step 356 determines if the cycle count is greater than 2. If not, factory preinstall routine is re-entered at step 206 (FIG. 9). If the cycle count is greater than 2, step 368 resets install. Step 370 sets a red alert and step 372 records the condition, faults the system and returns calibration program 150 to start.

If step 354 determines that factory install is complete, step 358 determines if the current mode is diagnostic. If so, step 360 determines if the cycle count is greater than 2. If so, steps 368, 370 and 372 are performed. If not, calibration program 150 returns to start. If step 358 determines that the current mode is not diagnostic, step 362 determines if the current mode is active weight. If so, step 364 determines if the cycle count is greater than 2. If so, steps 368 and 370 are performed. If not, calibration program 150 returns to start. If step 362 determines that the current mode is not active weight, step 366 determines if the cycle count is greater than two for faults other than install, diagnostic or active weight. If so steps 368,370 and 372 are performed. If not, calibration program 150 returns to start.

Figure 20:
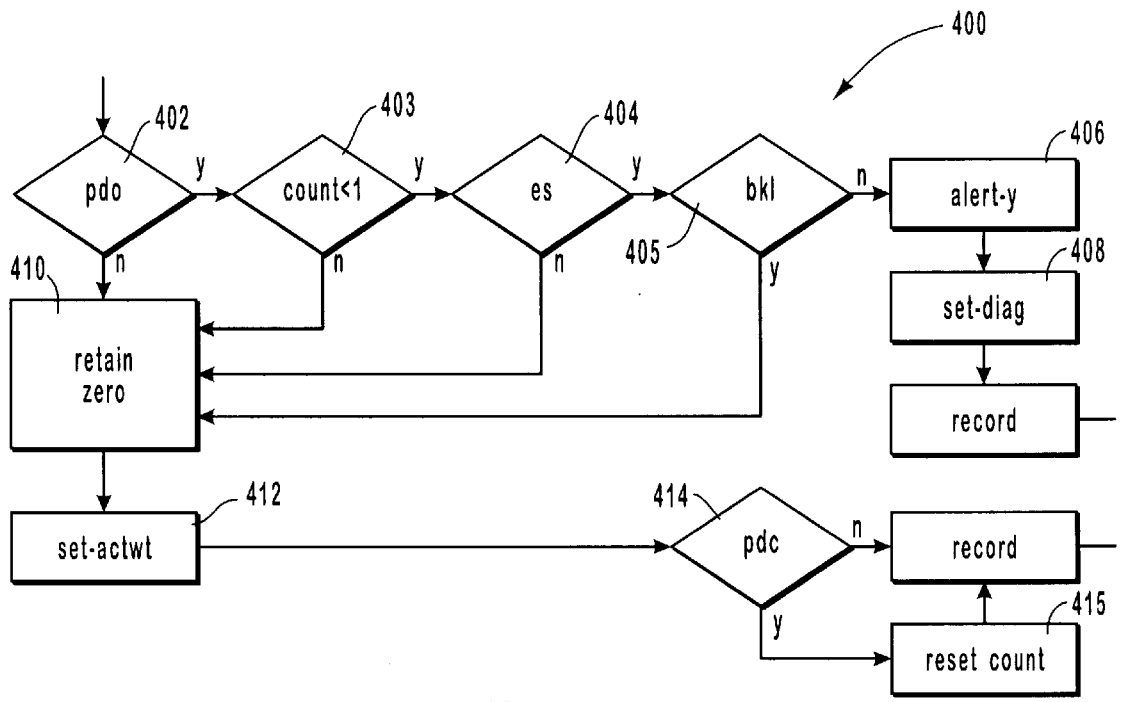
FIG. 20 is a flow diagram of the diagnostic/active weight portion of the FIG. 15 program.

Referring to FIG. 20, diagnostic/active weight mode routine 400 begins at step 402 determining if the passenger door is open. If so, step 403 determines if a diagnostic cycle count is less than one. If so, step 404 determines if the seat is empty. If so, step 405 determines if the seat buckle is latched. If not, a valid weight measurement window exists and step 406 sets yellow alert 124. Step 408 sets a diagnostic mode flag and calibration program 150 enters set thermal and read sensors routine 250.

If the passenger door is not open, the count is less than 1, the seat is not empty or the buckle is latched, step 410 retains the current temporary zero set values 154 and step 412 sets an active weight mode flag. Step 414 determines if the passenger door is closed. If not, calibration program 150 enters the set thermal and read sensors routine 250. If so, step 415 resets the diagnostic cycle count and calibration program 150 enters the set thermal and read sensors routine 250.

The diagnostic mode cycle count assures that for a continuously open passenger door, a diagnostic mode is performed a limited number of times, which for the illustrated embodiment is only once.

Figure 21:
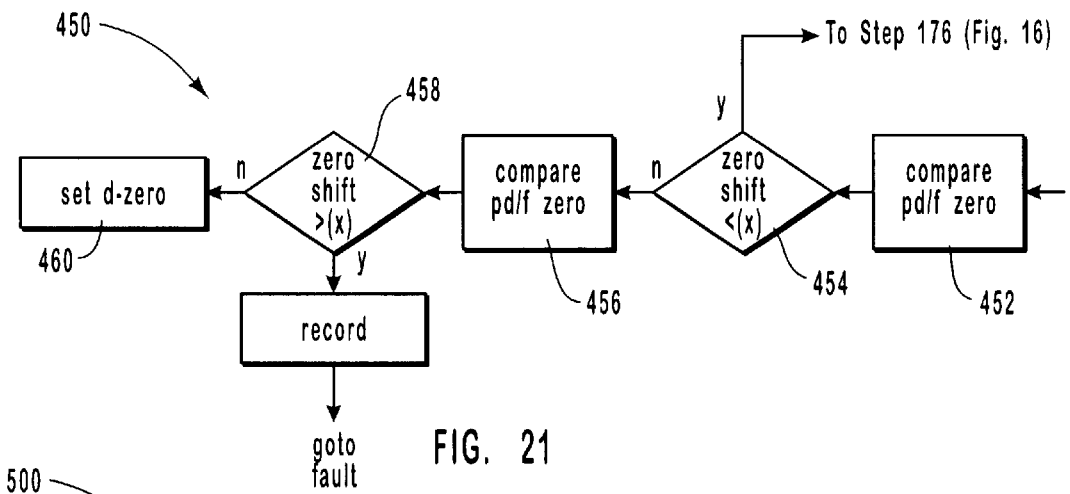
FIG. 21 is a flow diagram of the analyze diagnostic reads portion of the FIG. 15 program.

Referring to FIG. 21, analyze diagnostic reads routine 450 begins at step 452 with a comparison of the diagnostic sensor reads with the reference zero set values 156. Step 454 determines if there is a zero shift that is less than zero shift deviation 160 of x. If so, the temporary zero set values 154 established by a previous diagnostic cycle will be retained. Step 176 of FIG. 16 then determines if factory install is complete. If so, calibration program 150 proceeds to change diagnostic cycle count routine 500.

If step 454 determines that the zero shift is greater than x, step 456 compares the diagnostic sensor reads with the reference zero set values 156. Step 458 determines if the zero shift is greater than an acceptable maximum zero shift 162. If the zero shift exceeds acceptable limit 162, calibration program 150 enters fault processing routine 350. If step 458 determines that the zero shift is not greater than acceptable maximum limit 162, step 460 sets a new temporary set of values 154. These values will be used by weight management program 152 until changed by a subsequent diagnostic mode.

Figure 22:
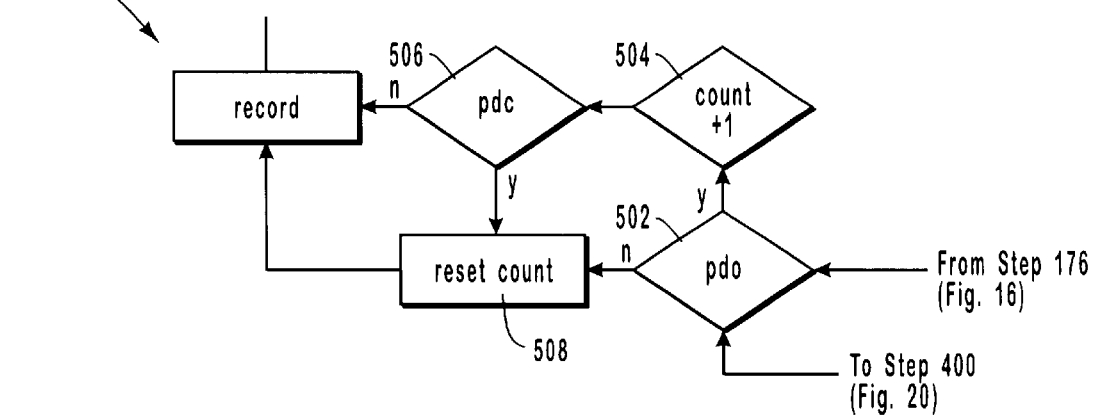
FIG. 22 is a flow diagram of the update diagnostic cycle count portion of the FIG. 15 program.

Referring to FIG. 22, change diagnostic cycle count routine 500 begins at step 502 with a determination of whether the passenger door is open. If not, step 508 resets the diagnostic cycle count and calibration program 150 enters weight management program 152. If so, the diagnostic cycle count is incremented at step 504. Step 506 determines if the passenger door is closed. If so, step 508 resets the diagnostic cycle count. If the passenger door is not closed (i.e., still open), calibration program 150 then enters weight management program 152.

The present invention having been thus described with particular reference to the preferred forms thereof, it will be obvious that various changes and modifications may be made therein without departing from the spirit and scope of the present invention as defined in the appended claims.

What is claimed is:

1. A method of automatically calibrating a characteristic of a weight sensor installed to sense weight of a seat in a motor vehicle that has a door and a seat belt with a buckle associated with the seat, said method comprising:
   (a) determining that the seat is empty and that a condition is present, where the condition is a member of the group consisting of the door being open and the seat belt being unbuckled;
   (b) if step (a) determines that the seat is empty and that said condition is present, establishing a set of values of said characteristic that define a zero set value; and (c) presenting the set of values that define a zero set value for in seat weight measurements.

2. The method of claim 1, further comprising:

(d) repeating steps (a), (b) and (c) so long as the seat is installed in the motor vehicle.

3. The method of claim 2, further comprising:

(e) retaining a first set of values established by a first performance of step (b) as a reference set of values.

4. The method of claim 3, further comprising:

(f) retaining a second set of values as a temporary set of values, if the second set of values (i) is established by step (b) after the reference set of values is established and (ii) exceeds a predetermined deviation from the reference set of values; and wherein step (c) presents the temporary set of values as defining a modified zero set value for said in seat weight measurements.

5. The method of claim 4, wherein the temporary set of values is one of a plurality of the temporary sets of values established by separate performances of step (b), and wherein step (c) presents the most recently established one of the temporary sets of values for the in seat weight measurements.

6. The method of claim 5, wherein the weight sensor is one of a plurality of weight sensors installed to sense said weight of the seat, and wherein the sets of values established by step (b) are derived from measurements of said characteristic of each of said plurality of weight sensors.

7. The method of claim 6, further comprising:

(g) limiting the number of times steps (a) through (h) are performed during the time the open door condition is found present.

8. The method of claim 1, further comprising:

(d) if step (a) determines that either the seat is not empty or the condition is not present, establishing the set of values;

(e) if the seat is still empty or the condition is still not present, rejecting the set of values;

(f) repeating steps (d) and (e) up to n times, where n is an integer greater than one;

(g) if the seat is found empty and the condition found present before step (e) is performed an nth time, retaining the set of values established by step (d); and (h) performing step (c) with the retained set of values.

9. The method of claim 1, further comprising:

(d) comparing the set of values with a specified set of values to produce a deviation;

(e) if the deviation exceeds a specified deviation, rejecting the set of values;

(f) repeating steps (d) and (e) up to n times, where n is an integer greater than one;

(g) if the deviation is found to be less than the specified deviation before step (e) is performed an nth time, retaining the set of values established by step (d); and (h) performing step (c) with the retained set of values.

10. The method of claim 7, wherein said characteristic is an electrical characteristic.

11. The method of claim 10, wherein said electrical characteristic is resistance.

12. The method of claim 11, wherein the weight sensor includes an electrical resistance element that has three or more electrical contacts, wherein said set of values is determined from measurements of the resistance values between the three or more terminals.

13. A seat weight measurement system for a seat in a motor vehicle, the motor vehicle having door and a seat belt with a buckle, said system comprising:

a weight sensor installed in said seat, said weight sensor having a characteristic that varies with the weight of said seat;

one or more detectors that detect if the seat is empty, if the door is open and the seat belt is unbuckled;

a computer controller for automatically calibrating said weight sensor by performing the steps of:

(a) determining that the seat is empty and that a condition is present, where the condition is a member of the group consisting of the door being open and the seat belt being unbuckled;

(b) if step (a) determines that the seat is empty and that said condition is present, establishing a set of values of said characteristic that define a zero set value; and (c) presenting the set of values that define a zero set value for in seat weight measurements.

14. The seat weight measurement system of claim 13, wherein the computer controller performs the further step of:

(d) repeating steps (a), (b) and (c) so long as the seat is installed in the motor vehicle.

15. The seat weight measurement system of claim 14, wherein the computer controller performs the further step of:

(e) retaining a first set of values established by a first performance of step (b) as a reference set of values.

16. The seat weight measurement system of claim 15, wherein the computer controller performs the further step of:

(f) retaining a second set of values as a temporary set of values, if the second set of values (i) is established by step (b) after the reference set of values is established and (ii) exceeds a predetermined deviation from the reference set of values; and wherein step (c) presents the temporary set of values as defining a modified zero set value for said in seat weight measurements.

17. The seat weight measurement system of claim 16, wherein the temporary set of values is one of a plurality of the temporary sets of values established by separate performances of step (b), and wherein step (c) presents the most recently established one of the temporary sets of values for the in seat weight measurements.

18. The seat weight measurement system of claim 17, wherein the temporary set of values is one of a plurality of the temporary sets of values established by separate performances of step (b), and wherein step (c) presents the most recently established one of the temporary sets of values for the in seat weight measurements.

19. The seat weight measurement system of claim 18, wherein the computer controller performs the further step of:

(g) limiting the number of times steps (a) through (h) are performed during the time the open door condition is found present.

20. The seat weight measurement system of claim 13, wherein the computer controller performs the further steps of:

(d) if step (a) determines that either the seat is not empty or the condition is not present, establishing the set of values;

(e) if the seat is still empty or the condition is still not present, rejecting the set of values;

(f) repeating steps (d) and (e) up to n times, where n is an integer greater than one;

(g) if the seat is found empty and the condition found present before step (e) is performed an nth time, retaining the set of values established by step (d); and (h) performing step (c) with the retained set of values.

21. The seat weight measurement system of claim 13, wherein the computer controller performs the further steps of:

(d) comparing the set of values with a specified set of values to produce a deviation;

(e) if the deviation exceeds a specified deviation, rejecting the set of values;

(f) repeating steps (d) and (e) up to n times, where n is an integer greater than one;

(g) if the deviation is found to be less than the specified deviation before step (e) is performed an nth time, retaining the set of values established by step (d); and (h) performing step (c) with the retained set of values.

22. The seat weight measurement system of claim 19, wherein said characteristic is an electrical characteristic.

23. The seat weight measurement system of claim 22, wherein said electrical characteristic is resistance.

24. The seat weight measurement system of claim 23, wherein the weight sensor includes an electrical resistance element that has three or more electrical contacts, wherein said set of values is determined from measurements of the resistance values between the three or more terminals.

25. A memory medium for controlling a computer controller of a seat weight measurement system for a motor vehicle having a seat, a door and a seat belt with a buckle, said memory medium comprising:

means for controlling the computer controller to perform the steps of:
(a) determining that the seat is empty and that a condition is present, where the condition is a member of the group consisting of the door being open and the seat belt being unbuckled;
(b) if step (a) determines that the seat is empty and that said condition is present, establishing a set of values of said characteristic that define a zero set value; and
(c) presenting the set of values that define a zero set value for in seat weight measurements.

26. The memory medium of claim 25, further comprising:

means for controlling the computer controller to perform the further step of:
(d) repeating steps (a), (b) and (c) so long as the seat is installed in the motor vehicle.

27. The memory medium of claim 26, further comprising:

means for controlling the computer controller to perform the further step of:
(e) retaining a first set of values established by a first performance of step (b) as a reference set of values.

28. The memory medium of claim 27, further comprising:

means for controlling the computer controller to perform the further step of:
(f) retaining a second set of values as a temporary set of values, if the second set of values (i) is established by step (b) after the reference set of values is established and (ii) exceeds a predetermined deviation from the reference set of values; and
wherein step (c) presents the temporary set of values as defining a modified zero set value for said in seat weight measurements.

29. The memory medium of claim 28, wherein the temporary set of values is one of a plurality of the temporary sets of values established by separate performances of step (b), and wherein step (c) presents the most recently established one of the temporary sets of values for the in seat weight measurements.

30. The memory medium of claim 29, wherein the weight sensor is one of a plurality of weight sensors installed to sense said weight of the seat, and wherein the sets of values established by step (b) are derived from measurements of said characteristic of each of said plurality of weight sensors.

31. The memory medium of claim 30, further comprising:

means for controlling the computer controller to perform the further step of:
(g) limiting the number of times steps (a) through (h) are performed during the time the open door condition is found present.

32. The memory medium of claim 25, further comprising:

means for controlling the computer controller to perform the further steps of:
(d) if step (a) determines that either the seat is not empty or the condition is not present, establishing the set of values;
(e) if the seat is still empty or the condition is still not present, rejecting the set of values;
(f) repeating steps (d) and (e) up to n times, where n is an integer greater than one;
(g) if the seat is found empty and the condition found present before step (e) is performed an nth time, retaining the set of values established by step (d); and
(h) performing step (c) with the retained set of values.

33. The memory medium of claim 25, further comprising:

means for controlling the computer controller to perform the further steps of:
(d) comparing the set of values with a specified set of values to produce a deviation;
(e) if the deviation exceeds a specified deviation, rejecting the set of values;
(f) repeating steps (d) and (e) up to n times, where n is an integer greater than one;
(g) if the deviation is found to be less than the specified deviation before step (e) is performed an nth time, retaining the set of values established by step (d); and
(h) performing step (c) with the retained set of values.

34. The memory medium of claim 31, wherein said characteristic is an electrical characteristic.

35. The memory medium of claim 34, wherein said electrical characteristic is resistance.

36. A method of automatically calibrating a characteristic of a weight sensor installed to sense weight of a seat in a motor vehicle, said method comprising:

(a) determining that the seat is empty;
(b) if step (a) determines that the seat is empty, establishing a set of values of said characteristic that define a zero set value; and
(c) presenting the set of values that define a zero set value for in seat weight measurements.

37. The memory medium of claim 34, wherein the weight sensor includes an electrical resistance element that has three or more electrical contacts, wherein said set of values is determined from measurements of the resistance values between the three or more terminals.

* * * * *